United States Patent [19]
Anderson

[11] 4,047,518
[45] Sept. 13, 1977

[54] SOLAR HEATING CELL

[76] Inventor: John Harland Anderson, 5 Woodcrest Drive, Burnsville, Minn. 55337

[21] Appl. No.: 565,796

[22] Filed: Apr. 7, 1975

Related U.S. Application Data

[63] Continuation-in-part of Ser. No. 449,761, March 11, 1974, abandoned, which is a continuation-in-part of Ser. No. 390,852, Aug. 23, 1973, abandoned.

[51] Int. Cl.² .............................................. F24J 3/02
[52] U.S. Cl. .................................................... 126/271
[58] Field of Search ................................. 126/270, 271

[56] References Cited

U.S. PATENT DOCUMENTS

| | | | |
|---|---|---|---|
| 1,215,293 | 2/1917 | McMurray et al. | 106/288 B |
| 1,217,165 | 2/1917 | Fessenden | 126/271 |
| 1,951,403 | 3/1934 | Goddard | 126/271 |
| 2,460,482 | 2/1949 | Abbot | 126/271 |
| 2,489,751 | 11/1949 | Candler | 126/271 |
| 2,713,006 | 7/1955 | Hunter | 106/308 |
| 2,843,536 | 7/1958 | Mount | 126/271 |
| 3,107,052 | 10/1963 | Garrison | 126/271 |
| 3,270,739 | 9/1966 | Thomason | 126/271 |
| 3,277,884 | 10/1966 | Rowekamp | 126/271 |
| 3,369,539 | 2/1968 | Thomason | 126/271 |
| 3,908,632 | 9/1975 | Poulsen | 126/271 |

*Primary Examiner*—Carroll B. Dority, Jr.
*Attorney, Agent, or Firm*—Orrin M. Haugen

[57] ABSTRACT

A system for gathering solar energy which includes a solar cell having an inlet and an outlet for the transmission of a fluid energy transfer medium therethrough. The fluid energy transfer medium is normally translucent, is provided with an energy absorbing material such as carbon black, with the carbon black being dispersed through the medium possibly aided by means of a detergent or other dispersant. The cell is provided with a sun-viewing inner base surface which is responsive to incident radiant solar energy by either being highly reflective or by being blackened or darkened in order to enhance the heat absorbing properties of the cell structure.

8 Claims, 5 Drawing Figures

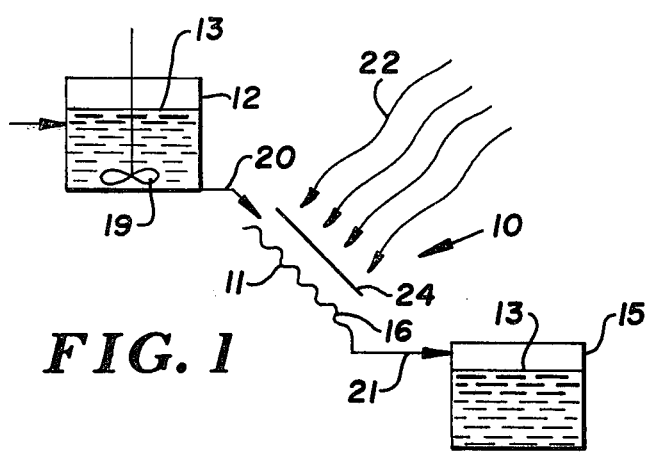
FIG. 1
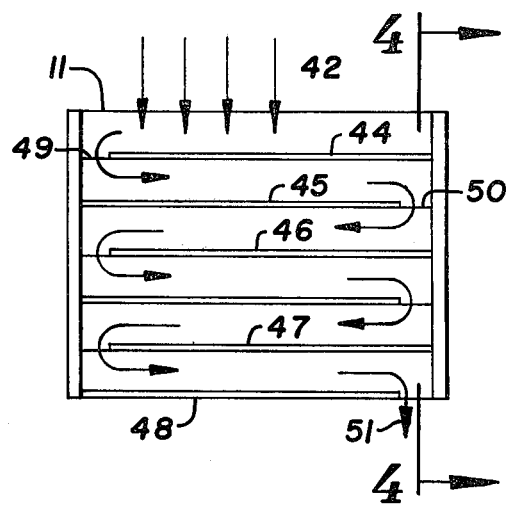
FIG. 3
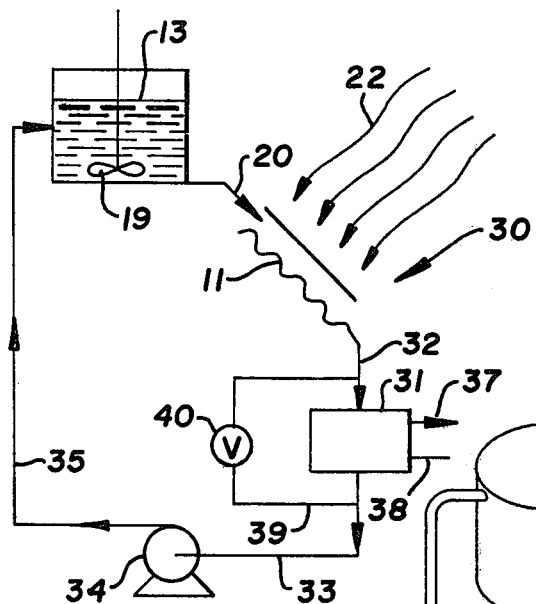
FIG. 2
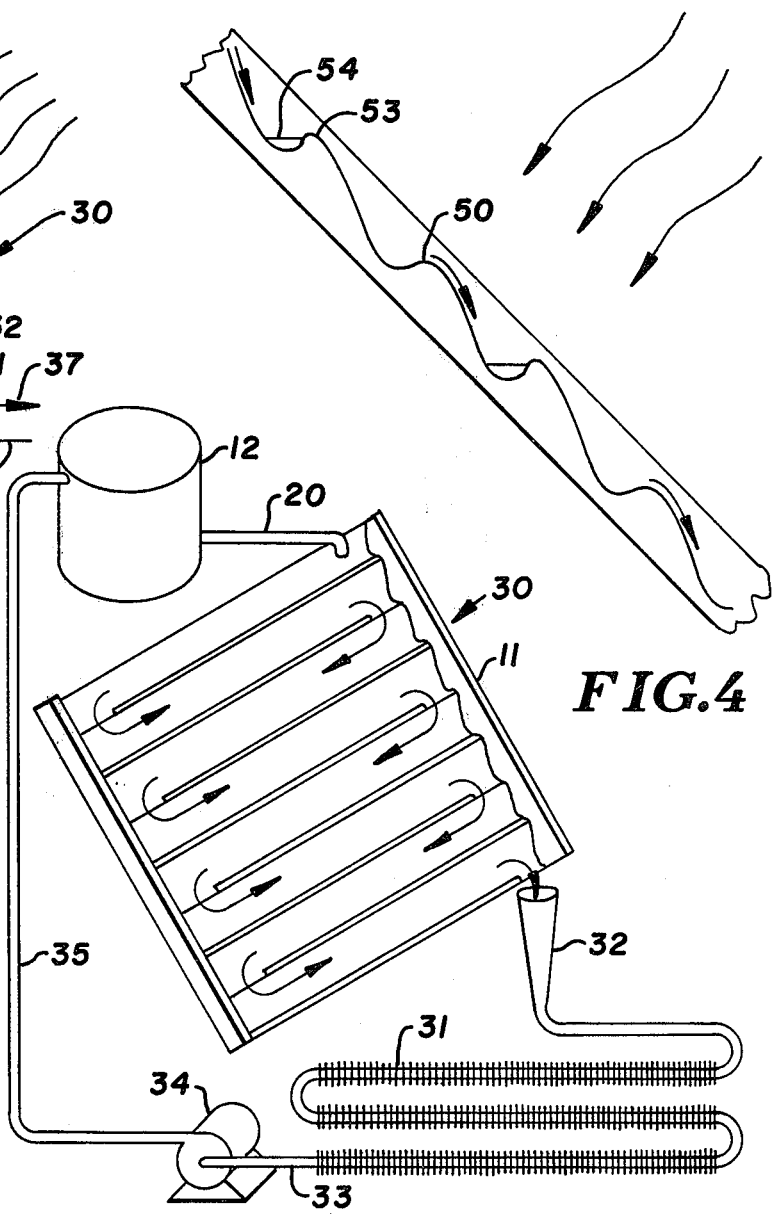
FIG. 4
FIG. 5

SOLAR HEATING CELL

CROSS-REFERENCE TO RELATED APPLICATION

The present application is a Continuation-in-Part of my co-pending application Ser. No. 449,761, filed Mar. 11, 1974 now abandoned, which in turn is a Continuation-in-Part of application Ser. No. 390,852, filed Aug. 23, 1973 and entitled "SOLAR HEATING CELL", now abondoned.

BACKGROUND OF THE INVENTION

The present invention relates generally to a solar energy gathering system, and more specifically to an improved solar energy gathering system which is provided with a solar cell supplied with a fluid energy transferring medium arranged to more efficiently absorb energy from the sun's rays. In this connection, therefore, the system of the present invention optimizes and renders more efficient the extraction of thermal energy from the available rays of the sun.

In the normal latitudes, particularly those less than 50° from the equator, there is normally adequate solar energy to be utilized to assist in heating living enclosures and also assist in providing energy for industrial operations such as steam generation or the like. Specifically, solar energy, which is universally available, may be gathered in order to reduce the consumption of fossil or other fuels normally employed in substantial quantities for energy generating operations. With the shortages of these fuels becoming more and more acute, it is deemed desirable to obtain energy from other sources, and solar energy, being universally available, may be extracted for proper utilization.

In the past, solar energy gathering systems have been proposed wherein a cell is provided with a darkened or blackened surface so as to more efficiently heat the cell surface with the fluid energy transfer medium being adapted to flow or otherwise move across the heated surface or the cell. In this connection, therefore, energy is transferred from the heated cell surface to the transfer medium by primarily conductive transfer. Thereafter, this heated fluid energy transfer medium is passed to a second conversion area where heat is extracted, and the medium either being discarded at that point, or recycled through the system for re-heating.

In the past, various oils, glycols, or water have been utilized as the fluid energy transfer medium. While each of these materials is normally available and useful, water is preferred because of its availability and low cost. However, since water is either transparent or translucent, the energy to be transferred to or from the water must be transferred primarily by conductive means. When oils, glycols, or the like are employed, substantially similar considerations apply.

SUMMARY OF THE INVENTION

In accordance with the present invention, however, it is proposed that the fluid energy transfer medium be treated so as to contain an in-situ absorbant material, such as carbon black or the like. The absorbant material is preferably dispersed through the system by means of a suitable dispersant, if total miscibility is not ordinarily readily obtained. The cell means of the present invention is also provided with an internal energy viewing or receiving surface which is responsive to incident solar radiant energy so as to be a highly reflective or a highly absorbing surface and disposed to view the rays of the sun, preferably normally thereto, with this energy receiving surface being either polished or blacked so as to enhance or otherwise improve the efficiency of the energy gathering system.

In the preferred system, water is employed as the fluid energy transfer medium because of its relatively high thermal capacity, and when water is so employed, carbon black together with a dispersant is also present in the solution.

Normally, a system will contain a charge of water, such as approximately 100 to 1500 gallons of water for a conventional residence, depending upon demands, with the water being arranged to deliver heat to a transfer substance or to a heat storage medium arranged in the interior of the structure. Conventional heat exchangers including rock chambers may be employed, with, for example 1500 and up to 3000 gallons of water being utilized for assisting in the heating of a conventional residence dwelling. The surface area required for the solar energy gathering cell is a function of the end use as is the area to be utilized for extracting energy from the transfer medium. Obviously, flow rates and residence time will be a factor for consideration as well as other design parameters. Furthermore, changes in state may be undertaken with steam generation a possibility.

Energy from the sun is radiated from the planet in the form of a wide spectrum of wave energy. Wave lengths shorter than the ultraviolet, as well as longer than the infra-red are provided, including the intermediate visible wave lengths. On cloudy days, less than approximately 50% of the solar energy reaches the surface of the earth, nearly all of this being in the form of visible light. The other waves, that is, the shorter wave length and the longer wave length, are either reflected by clouds back into space, or are absorbed by the atmosphere. It is known, however, that the average amount of energy which ultimately falls on the earth is far in excess of that required for daily consumption.

In a conventional dwelling, the roof top is the most desired or most accessible area for mounting the energy absorbing cell. Means are provided for both receiving this energy in a fluid transfer medium, and thereafter transferring the medium to a destination where the thermal energy may be extracted.

Therefore, it is a primary object of the present invention to provide an improved solar energy gathering system which employs a solar cell having improved efficiency for gathering solar energy from the available direct and diffused rays of the sun.

It is a further object of the present invention to provide an improved solar energy gathering system which utilizes an improved solar cell having means for transferring energy to an in-situ absorbant contained directly in the fluid energy transferring medium.

It is yet a further object of the present invention to provide an improved solar energy gathering system which employs a cell having a fluid energy transfer medium passing across the exposed surface thereof, with the fluid energy transfer medium containing an in-situ thermal absorbant which is substantially uniformly dispersed therethrough.

Other and further objects of the present invention will become apparent to those skilled in the art upon a study of the following specification, appended claims, and accompanying drawings.

BRIEF DESCRIPTION OF THE DRAWINGS

FIG. 1 is a schematic diagram of one typical embodiment of the present invention;

FIG. 2 is a schematic diagram illustrating a form or embodiment of the present invention utilizing a circulating pump;

FIG, 3 is a detail plan view of a solar energy gathering cell prepared in accordance with the present invention;

FIG. 4 is a vertical sectional view taken along the line and in the direction of the arrows 4—4 of FIG. 3; and FIG. 5 is an isometric view illustrating one typical embodiment of the present invention employing a recirculation system.

DESCRIPTION OF THE PREFERRED EMBODIMENT

Attention is now directed to FIG. 1 of the drawings wherein a schematic diagram is shown illustrating one aspect of the manner in which the invention may be practiced. In this illustration, the solar energy gathering system generally designated 10 includes a cell 11 for the transmission of a fluid energy transfer medium therethrough, with an input reservoir being shown at 12 for receiving and retaining a charge of fluid energy transfer medium therein, such as at 13, and with a receiving receptacle or reservoir being shown at 15. The fluid energy transfer medium is arranged to pass through the cell, such as is illustrated by the appropriate arrows, and the surface portion 16 of the cell is provided with a black heat absorbant surface coating so as to enhance the amount of energy received and retained by this surface. The fluid energy transfer medium 13 is normally translucent, and is also normally in the liquid state at ordinary ambient environmental conditions. The ordinary ambient environmental conditions are those conditions normally found for apparatus of this type, and when water is employed as the medium, an antifreeze component may be added in the event any portion of the system is subjected to temperatures below 32° F. The fluid energy transfer medium is provided with a solar energy absorbing medium in order to enhance the efficiency of the device. The solar energy absorbing medium is present in the fluid energy transfer medium in a quantity sufficient so as to render the medium substantially opaque. This condition will permit a substantial portion, if not all, of the incident radiation to be absorbed in the medium, and thereby effectively and efficiently transferred to the bulk solution. As an example, when water is employed as the transfer medium, carbon black is preferred as an absorbant, while a dispersant such as, for example, Agar, gum arabic, sodium alginate and it analogs, or a detergent such as octyl or nonylphenoxyethanol, as a dispersant. Pectins, gelatin, polyvinylpyrrolidine, or colloidal clays may be utilized.

In order to assist the dispersant in maintaining the carbon black in totally miscible condition, a stirring rod or other arrangement is provided in the storage vessel 12, such as is illustrated at 19. This enhances the ability of the system to maintain the energy absorbing material in proper suspension. Means are provided for passing the fluid energy transfer medium through the system, such as the conduit shown at 20, which delivers the transfer medium to the solar cell 11, and with conduit means 21 being illustrated schematically for delivering the heated medium from the cell 11 into the reservoir 15. Incident solar energy is shown as at 22, wherein this energy is received on the surface 16 of the cell 11. For certain applications, it may be desirable to utilize an isolated chamber for the cell 11, and in such a situation, an infra-red transparent shield is provided such as is illustrated at 24. Obviously, edge surfaces will be provided as well, but these isolating surfaces are not shown here for purposes of clarity.

Attention is now directed to FIG. 2 of the drawings wherein a modified form of embodiment is illustrated, and with this arrangement and system being shown generally at 30. Where identical components are utilized, identical reference characters will be utilized. In this arrangement, therefore, the energy extracting zone is shown at 31 which is arranged to receive heated fluid energy transfer medium from the cell 11 through conduit shown illustrated schematically at 32. Conduit 33 is utilized to transfer the medium from chamber 31 to circulating pump 34, and thence through conduit 35 to return to chamber 12. In this arrangement, therefore, it is possible to continuously maintain flow material through the system, with energy being extracted as required through heat exchanger or other device 31. In the event there is no call for additional energy in the system fed by conduits 37 and 38, bypass 39 along with appropriate valving as at 40 may be utilized.

Attention is now directed to FIG. 3 of the drawings wherein the details of the flat plate collector solar cell 11 are illustrated. In this illustration, the carbon black ladened water is directed onto the surface of the structure 11 as at 42, with the structure having an array of baffles, such as baffles 44-48 inclusive, with these baffles providing gates at alternate ends of the device such as at 49 and 50, so as to provide a serpentine path for the carbon black ladened water for ultimate discharge through end or terminal gate 51.

With attention being directed to FIG. 4 of the drawings, it will be observed that the device may, in certain instances, employ a plurality of louvres for transferring the fluid energy transfer medium thereover, and exposing a greater quantity of the material to incident radiation. In this system, alternate barrier elements are shown as at 53-53, with intermediate reservoirs being illustrated at 54-54, for receiving and retaining quantities of fluid energy transfer medium as it cascades down the surface. It is this type of exposure which enhances the ability of the material to maintain the carbon black properly dispersed through the system whenever necessary.

Attention is now directed to FIG. 5 of the drawings wherein a further system is illustrated, with this system being based essentially on the schematic illustration of FIG. 2. In this arrangement, the typical residential dwelling may be heated, or the heating plant supplemented by this system, with typical volumes, temperatures and the like being scaled from the data provided in Table I hereinbelow.

TABLE I

A solar cell, open to the atmosphere, was designed having inside dimensions of 38½ × 11½ inch. The base was in the form of louvres, painted with "Rustoleum" wrought-iron flat black paint, with the individual louvres extending with their axes parallel to the long direction of the cell. The louvres extended 10½ inches, leaving an opening at the ends so as to enhance fluid flow therethrough. The louvres were 1¼ inch, peak-to-peak, with the valley depth being ¼ inch.

In order to approximate window protection, the unit was placed in viewing relationship to the sun through a conventional "Thermopane" glass, with these "Thermopane" structures being, of course, commercially available.

The cell was supplied with a medium having the following formulation:

| | |
|---|---|
| Water | 1 quart |
| Carbon black ("Airflow" Carbon, Royal Charcoal Co., Grain size 400–800 mesh) | 2 tablespoons per quart |
| Detergent (Ajax household detergent) | 1 ml. |

The flow rate was 4 quarts per hour through the cell, and the cell provided a heat gain in the material passing therethrough of $17\frac{1}{2}°$ C. in the first 20 minutes, and continued to show heat gain for a period of 2 hours, at which time a temperature of 56° C. was achieved in the medium.

It will be appreciated that the solar energy gathering system of the present invention may be applied to a variety of systems, including, for example, heating of residence dwellings, heating of commercial establishments, gathering of energy for industrial operations, as well as other uses.

While carbon black is a preferred solar energy absorbing medium for use in combination with water, oil, or other commonly available liquids, it will be appreciated that other absorbants may be used as well. As examples, it has been found that materials such as carbon black in its various forms, including lampblack, black platinum, copper sulfide, nickel sulfide, copper iron sulfide, asphalt for use with oil solvents, or the like. The light absorbing materials are exposed, while traveling through the solar cell, as suspended particles to incident solar radiation. These materials are then heated by exposure to this radiation and dissipate their thermal energy through the carrying medium or otherwise. In one embodiment, the light absorbing medium may be maintained in dry state, exposed to solar radiation and while in fluidized state, treated so as to dissipate absorbed thermal energy. The suspending gas is preferably effectively inert, such as $CO_2$, Argon, Helium, or the like, in order to supress potential combustion. In order to assist in following the sun, means may be provided so as to maintain the cell 11 in a disposition which is substantially normal to the radiation from the sun. Generally speaking, particle size should be in the range of from 100 mesh downwardly to colloidal sizes, with the smaller particle sizes generally being preferred.

It has also been found that the transfer of energy to the fluid energy transfer medium amy be enhanced if the louvres along the surface of the cell are provided with Mammut beads, these beads being provided so as to baffle the flow, and enhance the ability of the cell to expose the fluid to incident radiation.

In most applications, a quantity of carbon black in a range of approximately 2 tablespoons per quart of water has been found sufficient. Also, the quantity of dispersant employed is ideally in the range of 1 ml per quart, with the dispersant being either octyl or nonylphenoxyethanol.

In a modified embodiment of the present invention, and with particular attention being directed to FIG. 1 of the drawings, the surface 16 is rendered reflective, that is by polishing or the like so as to effectively reflect incident radiation back through the flowing fluid. In this fashion, therefore, the radiant energy passes through the material on two occasions, thereby reducing the quantities of loading material otherwise required. For example, and with particular attention being directed to Table I hereinabove, the carbon black was effectively halved, while the base was polished to a bright metallic reflective surface. The base, in this instance, was in the form of a polished aluminum surface with a thin transparent metal-protecting film applied thereover so as to prevent oxidation of the aluminum and consequent reduction in reflectivity. With this exception in the carbon black content, as well as in the treatment of the metal surface, the remaining features were the same. In a test of the system, a heat gain of from 21° C. up to $38\frac{1}{2}°$ C. was achieved in 10 minutes.

For the materials of construction forming the solar exposed flat plate element, solar transmissive material such as ordinary window glass may be utilized, along with such alternatives as hard-tempered glass, Tedlar, which is polyvinylfluoride film available commercially from the E. I. DuPont deNemours Corp. of Wilmington, Del, or fiberglass filled epoxy. Each of these materials are known to transmit solar energy of a wave length above 2800° – 3000 A°. These elements work exceptionally well in a stationary unit such as a flat plate collector for roof top or wall mounting.

The structure of the present invention provides an effective "liquid backed" flat plate collector in which in-situ absorbants are capable of providing a substantial quantity of effective solar energy absorbing surfaces.

I claim:

1. Solar energy gathering system including, in combination:
   a. cell means including a generally solar transmissive enclosed fluid retaining zone with length and width dimensions substantially greater than the thickness dimension, and with an inclined flat plate disposed for solar viewing and forming one wall of said enclosure and having an inlet and an outlet for the transfer of fluid energy transfer medium therethrough, surface means including said flat solar transmissive plate comprising the solar viewing wall of said cell means, an opaque solar radiation responsive plate forming a backing plate for said cell means, and with said solar viewing wall and said backing plate being arranged to support, retain and expose said fluid energy transfer medium contained therein to incident solar energy;
   b. a fluid energy transfer medium arranged to flow through said cell and comprising a fluid normally in liquid state at ordinary ambient environmental conditions and being normally translucent;
   c. a solar energy absorbing medium in substantially uniformly dispersed admixture with said fluid energy transfer medium and present in sufficient quantities so as to render said energy transfer medium as retained within said cell and between said solar viewing wall and said backing plate substantially opaque to incoming incident solar energy;
   d. a dispersant in said fluid energy transfer medium for maintaining said solar energy absorbing medium in substantially uniform dispersion within said fluid energy transfer medium;
   e. pumping means for forcibly transferring said fluid energy transfer medium through said system;
   f. a heat extraction vessel for receiving fluid energy transfer medium from said cell means in liquid state and having at least one heat exchange surface for extracting thermal energy from said fluid energy transfer medium; and g. said pumping means including means for recirculating spent fluid energy transfer medium from said heat extraction vessel to the inlet of said cell means.

2. The solar energy gathering system as defined in Claim 1 being particularly characterized in that said fluid energy transfer medium is water and said solar energy absorbing medium is selected from the group consisting of lampblack, black platinum, copper sulfide, nickel sulfide, and copper iron sulfide.

3. The solar energy gathering system as defined in claim 1 being particularly characterized in that said solar cell means, heat extraction vessel, and means for transferring said fluid energy transfer medium are disposed in a system isolated from direct exposure to ambient.

4. The solar energy gathering system as defined in claim 1 being particularly characterized in that said surface means disposed within said cell means includes an inclined backing plate arranged to view incident solar energy and is reflective thereto.

5. The solar energy gathering system as defined in claim 1 being particularly characterized in that said surface means disposed within said cell means is arranged to view incident solar energy, and is coated with a heat absorbing film.

6. The solar energy gathering system as defined in claim 5 being particularly characterized in that said fluid energy transfer medium is water and said solar energy absorbing medium is selected from the group consisting of lampblack, black platinum, copper sulfide, nickel sulfide, and copper iron sulfide.

7. The solar energy gathering system as defined in claim 6 being particularly characterized in that dispersant means are provided in admixture with said fluid energy transfer medium in an amount of 0.1% dispersant.

8. The solar energy gathering system as defined in claim 2 being particularly characterized in that said solar energy absorbing medium is lampblack having a particle size of below 100 mesh.

* * * * *